Patented June 21, 1927.

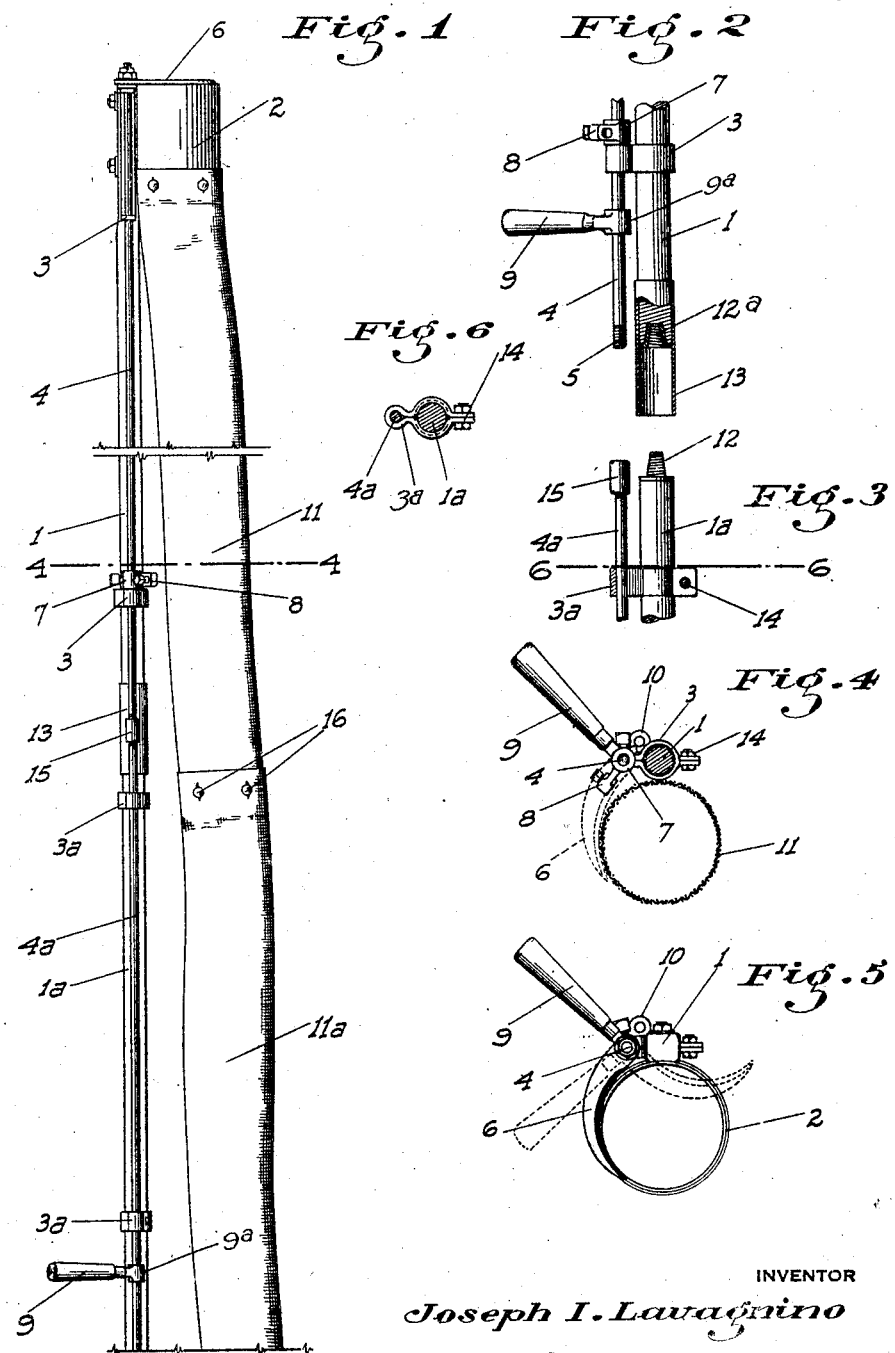

1,632,977

UNITED STATES PATENT OFFICE.

JOSEPH I. LAVAGNINO, OF ANGELS CAMP, CALIFORNIA.

FRUIT-PICKING APPARATUS.

Application filed February 27, 1925. Serial No. 11,992.

This invention relates to improvements in devices for picking or gathering fruit, my principal object being to provide a device for the purpose whereby the fruit on the tree may be readily picked therefrom and lowered to the ground without bruising and while the picker maintains a stand on the ground.

My device is especially useful in picking fruit from tall trees or when the fruit is more or less inaccessible from a ladder, or the limbs of the tree are not of such strength or character as to allow the picker to climb out along the same.

Furthermore even when the limbs are strong and the fruit is within reach of a ladder the picker frequently loses his balance or the ladder falls, resulting in accidents of varying severity.

Such occurrences are impossible with the use of my device and the fruit may be picked with ease and security.

A further object of the invention is to provide a device whose handle and other operating parts are so constructed that the gatherer may easily and quickly arrange the structure for use in connection with either low or tall trees.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a side elevation of the device partly broken out with the detachable sections assembled together.

Fig. 2 is a fragmentary view partly in section of the lower end of the main handle supporting member.

Fig. 3 is a similar view of the adjacent or upper end of the lower supporting section.

Fig. 4 is a cross section on the line 4—4 of Fig. 1, the knife at the upper end of the structure being shown in dotted lines to indicate its setting relative to the handle.

Fig. 5 is a top plan view of the device, the position of the handle and knife when the handle is moved across the band being shown in dotted lines.

Fig. 6 is a cross section on the line 6—6 of Fig. 3.

Referring now more particularly to the characters of reference on the drawings, the numeral 1 denotes a rigid supporting member on the upper end of which and at one side is rigidly secured a tube-like band 2 whose axis is parallel to the support.

Fixed in vertically spaced relation on the support 1 on one side of the same relative to the tube 2 are bearing sleeves 3 in which is turnably mounted a rod 4 whose lower end terminates at the bottom of the member 1 and is threaded on such end as at 5. Fixed on top of the rod 4 is a horizontal crescent shaped knife 6 disposed just above the top of the cup 2 and adapted to swing across the same about the rod 4 as an axis.

Turnably adjustable on the rod 4 is a collar 7 having a radially projecting stop 8 adapted to abut against the support 1 after the knife has moved a certain distance across the band 2, which amount may, of course, be varied to suit different requirements by adjusting the collar.

A handle 9 to operate the knife, and having an orificed sleeve 9ª to fit the rod 4 is removably mounted on the latter below the lowermost bearing 3 and extends radially of the rod.

The sleeve 9ª is held in position on the rod by a finger set screw 10 which also serves as a stop to abut against the support 1. The handle 9 is so initially positioned on the rod that the member 10 abuts against said support when the knife 6 is at its starting or retracted position, as shown in Fig. 5.

A tube-like chute 11 preferably of a flexible and strong material such as canvas or the like is attached to and surrounds the lower end of the band 2 and depends thence to the bottom of the support 1 or even lower.

In operation the support 1 is grasped by the picker and manipulated so that the band 2 is positioned around a fruit to be picked with the stem of the fruit in horizontal alinement with the knife. The handle 9 is then turned the distance allowed between the stops causing the knife to sweep across the band and sever the stem. The fruit drops into the chute 11 and travels down the same into a bag or basket carried by the picker (not shown).

The adjustable stop 8 allows the knife to be swung to correct distance to engage the stem and no more, depending on the kind of fruit being picked.

It will be obvious that in picking large fruit such as grape-fruit or oranges which will just about fill the cup the knife does not need to travel as far as when peaches or the like are being picked, since this smaller fruit may lie on the far side of the band. The movement of the knife may thus be coordinated to the conditions of operation.

In the event that a single length of supporting member 1 is not sufficient I have provided an additional section constructed as hereinafter seen, which may be easily applied to the main section.

This additional section comprises a support $1^a$ corresponding to the support 1. The upper end of the support $1^a$ has a screw 12 to fit into a tapped socket $12^a$ in the lower end with member 1. A sleeve 13 press-filled or otherwise mounted on the member 1 projects therebelow and is adapted to snugly receive the upper end of the section $1^a$ therein, thus taking the lateral strain off the screw connection.

Turnably mounted on the section $1^a$ at suitably spaced intervals are bearing sleeves $3^a$ corresponding to the sleeves 3 in which a length rod $4^a$ corresponding to the rod 4 is turnably mounted.

The turnable sleeves $3^a$ are necessary to enable the rods 4 and $4^a$ to be properly lined up since when the sections 1 and $1^a$ are screwed together they are not necessarily lined up the same every time.

When the rods 4 and $4^a$ are in proper alinement the sleeves $3^a$ are tightened on the member $1^a$ by suitable clamping means 14 provided in connection therewith.

The rod $4^a$ has a screw coupling 15 on its upper end adapted to screw onto the threaded end 5 of the rod 4.

Prior to this last operation the handle 9 is removed from the rod 4 and replaced on the lower end of the rod $4^a$ as shown in Fig. 1. When the rods are tightly coupled together the handle is positioned, and the set screw 10 then tightened up so as to locate said handle in the correct position relative to the knife as previously described. The stop 8 is not disturbed unless fruit of a different nature is now to be picked.

The added length of chute $11^a$ is removably fastened to the chute 11 preferably by means of a button and buttonhole arrangement as indicated at 16.

It will therefore be seen that the change from a short to a long handled device and vice versa may be quickly and easily made without lessening in any way the efficiency of operation of the structure.

From the foregoing description it will be readily seen that I have produced such a device as substantially fulfills the objects of the invention as set forth herein.

While this specification sets forth in detail the present and preferred construction of the device, still in practice such deviations from such detail may be resorted to, as do not form a departure from the spirit of the invention, as defined by the appended claim.

Having thus described my invention what I claim as new and useful and desire to secure by Letters Patent is:

A fruit picker comprising a rigid support, an annular band secured at one end of the support and adapted to embrace the fruit to be picked, a turnable rod bracketed to the support parallel thereto, a cutting blade fixed to the top of the rod and arranged to sweep across the top edge of the band, hand means applied to the rod for turning the same and manipulating the blade, a collar turnably mounted on the rod separate from the handle, means for holding the collar set at any position about the rod, and a stop member projecting from the collar and positioned to engage the support after the rod has been turned a predetermined distance.

In testimony whereof I affix my signature.

JOSEPH I. LAVAGNINO.